United States Patent
Hashigaya et al.

(10) Patent No.: US 9,114,686 B2
(45) Date of Patent: Aug. 25, 2015

(54) AIR CONDITIONING SYSTEM FOR AN ELECTRIC VEHICLE

(75) Inventors: Hideki Hashigaya, Shizuoka (JP); Kensuke Momose, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 283 days.

(21) Appl. No.: 13/545,310

(22) Filed: Jul. 10, 2012

(65) Prior Publication Data

US 2013/0020045 A1  Jan. 24, 2013

(30) Foreign Application Priority Data

Jul. 20, 2011  (JP) .................... 2011-158809

(51) Int. Cl.
- F25B 27/00 (2006.01)
- G05D 23/19 (2006.01)
- B60H 1/00 (2006.01)

(52) U.S. Cl.
CPC .................... B60H 1/00428 (2013.01)

(58) Field of Classification Search
CPC .............. B60H 1/00428; F25B 2700/15
USPC .............. 62/236; 236/46 C; 165/202
See application file for complete search history.

(56) References Cited

U.S. PATENT DOCUMENTS

| | | | | |
|---|---|---|---|---|
| 2002/0113576 | A1* | 8/2002 | Oomura et al. | 320/134 |
| 2013/0096734 | A1* | 4/2013 | Tonegawa et al. | 701/2 |

FOREIGN PATENT DOCUMENTS

| | | | |
|---|---|---|---|
| JP | 5-155233 A | 6/1993 |
| JP | 7-193901 A | 7/1995 |
| JP | 7-232545 A | 9/1995 |
| JP | 9-109648 A | 4/1997 |
| JP | 2010-154646 A | 7/2010 |
| JP | 2012-11907 A | 1/2012 |

OTHER PUBLICATIONS

Office Action mailed Jun. 5, 2014 in corresponding Chinese Patent Application No. 201210252202.6 (with an English translation) (9 pages).

Notification of Completion for Formalities of Registration mailed Dec. 1, 2014 in corresponding Chinese Patent Application No. 201210252202.6 (with an English translation) (4 pages).

* cited by examiner

*Primary Examiner* — Allana Bidder
*Assistant Examiner* — Dawit Muluneh
(74) *Attorney, Agent, or Firm* — Rothwell, Figg, Ernst & Manbeck, P.C.

(57) ABSTRACT

There is provided an air conditioning system for a passenger compartment R of an electric vehicle having a rechargeable battery unit that is chargeable by supply of power from an external power source external to the vehicle. An air conditioner (AC) ECU 27 acquires a preparatory air conditioning time γ that is the time it takes to condition the interior air of the vehicle to a target interior air temperature 27T. An HEV controller 25 acquires from a quick charger 100 a charge time left 100R that is the time it takes until charge is completed and initiate preparatory air conditioning within the passenger compartment if the charge time left 100R is less than or equal to the preparatory air conditioning time γ.

4 Claims, 7 Drawing Sheets

CALCULATION OF TEMPORARY PREPARATORY AIR CONDITIONING TIME $\alpha$

| | | AMBIENT AIR TEMPERATURE 22T | | | | | |
|---|---|---|---|---|---|---|---|
| | | −10°C | 0°C | 10°C | 20°C | 30°C | 40°C |
| INTERIOR AIR TEMPERATURE DEVIATION d | −10°C | $\alpha 11$ | $\alpha 12$ | $\alpha 13$ | $\alpha 14$ | $\alpha 15$ | $\alpha 16$ |
| | 0°C | $\alpha 21$ | $\alpha 22$ | $\alpha 23$ | $\alpha 24$ | $\alpha 25$ | $\alpha 26$ |
| | 10°C | $\alpha 31$ | $\alpha 32$ | $\alpha 33$ | $\alpha 34$ | $\alpha 35$ | $\alpha 36$ |
| | 20°C | $\alpha 41$ | $\alpha 42$ | $\alpha 43$ | $\alpha 44$ | $\alpha 45$ | $\alpha 46$ |
| | 30°C | $\alpha 51$ | $\alpha 52$ | $\alpha 53$ | $\alpha 54$ | $\alpha 55$ | $\alpha 56$ |
| | 40°C | $\alpha 61$ | $\alpha 62$ | $\alpha 63$ | $\alpha 64$ | $\alpha 65$ | $\alpha 66$ |

FIG. 5

CALCULATION OF CORRECTION TIME FOR SOLAR RADIATION $\beta$

| | DETERMINATION OF SOLAR RADIATION 23N [kw/m²] | | | | | |
|---|---|---|---|---|---|---|
| | 0 | 100 | 200 | 300 | 400 | 500 |
| $\beta$ | $\beta 1$ | $\beta 2$ | $\beta 3$ | $\beta 4$ | $\beta 5$ | $\beta 6$ |

FIG. 6

CALCULATE PREPARATORY AIR CONDITIONING TIME γ

| AMBIENT AIR TEMPERATURE | γ (PREPARATORY AIR CONDITIONING TIME) | REMARKS |
|---|---|---|
| LOWER THAN OR EQUAL TO 10°C | α − β | IN WINTER, THE AIR HEATING (OR AIR CONDITIONING) TIME GETS SHORT AS THE LEVEL OF SOLAR RADIATION BECOMES HIGH BECAUSE THE SOLAR RADIATION GIVES SUBSTANTIAL WARMING EFFECT. |
| HIGHER THAN OR EQUAL TO 30°C | α + β | IN SUMMER, THERE IS A NEED TO EXTEND THE AIR COOLING (OR AIR CONDITIONING) TIME TO COMPENSATE FOR AN INCREASE IN INTERIOR AIR TEMPERATURE CAUSED BY SOLAR RADIATION ENERGY. |
| OTHER THAN THOSE ABOVE | α | IN THE MIDDLE RANGE, THE SOLAR RADIATION INFLUENCE IS NOT CONSIDERED. |

AIR CONDITIONING SYSTEM FOR AN ELECTRIC VEHICLE

RELATED APPLICATIONS

The present application claims priority to Japanese Patent Application No. JP2011-158809 filed on Jul. 20, 2011, the entire contents of which are being incorporated herein by reference.

TECHNICAL FIELD

The present invention relates to air conditioning systems for electric vehicles and more particularly to an air conditioning system for conditioning a passenger compartment of an electric vehicle during charge.

BACKGROUND ART

There are known a battery or pure electric vehicle (EV) which uses one or more electric traction motors and a hybrid electric vehicle (HEV) which combines an internal combustion engine propulsion system with an electric propulsion system. These vehicles derive all their electric power from their large capacity rechargeable battery units for power supply to traction motors and air conditioners for air conditioning in their passenger compartments. In some electric vehicle, an improvement in convenience of driving is made by charging its battery unit during regenerative braking and by restoring the battery unit to an acceptable upper charge level with an external battery charger.

It is known from Patent Document 1 to condition air so that interior temperature and the like within a passenger compartment of an electric vehicle may be comfortable or, in other words, carry out a so-called "preparatory air conditioning" during charge in order to ensure comfortable environment for a user to get in the vehicle and drive after charge. By carrying out such preparatory air conditioning during charge, the amount of power consumed by an air conditioner can be saved during driving, resulting in an appreciable extension of driving range between charges in addition to improved comfort in the passenger compartment. The above-mentioned Patent Document 1 proposes intermittently turning on and off an air conditioner in order to reduce load derived from carrying out the preparatory air conditioning.

PRIOR ART DOCUMENT

Patent Document

Patent Document 1: JP patent application laid-open publication No. 7-232545 (JP07-232545A)

SUMMARY OF THE INVENTION

Problem to be Solved

According to the automotive air conditioning system of the above kind, however, carrying out preparatory air conditioning during charge allows the air conditioner to keep on working using electricity even after conditioning air within the passenger compartment to a comfortable level. This sometimes causes the air conditioning system to prolong time required for charging a rechargeable battery unit to an acceptable upper charge level and to waste electricity.

Incidentally, it can be assumed that many and unspecified users visit a facility, available away at home or office, where battery chargers are installed. In such facility, there is a desire to reduce waiting time by charging the battery unit at the minimum charge time, not to mention a desire to reduce consumption of electricity. Such desires remain during charge at home using a battery charger.

Accordingly, there is a need for an air conditioning system that ensures an efficient preparatory air conditioning without any waste.

Solution to the Problem

According to a first aspect of the present invention, there is provided an air conditioning system for a passenger compartment of an electric vehicle having a rechargeable battery unit that is chargeable by supply of power from an external power source. The system includes a charge time left acquisition unit configured to acquire a charge time left that is the time it takes to charge the battery unit until charge is completed; an air conditioning time acquisition unit configured to acquire an air conditioning time that is the time it takes to condition air within the passenger compartment to a target temperature; and a control unit configured to allow conditioning air within the passenger compartment if the charge time left is less than or equal to the air conditioning time.

According to a second aspect of the present invention, the system further includes an interior air temperature detection unit configured to detect an interior air temperature within the passenger compartment; and an outside air temperature detection unit configured to detect an outside air temperature outside the passenger compartment. In the system, the air conditioning time acquisition unit acquires the air conditioning time based on a result of detection by the interior air temperature detection unit and a result of detection by the outside air temperature detection unit.

According to a third aspect of the present invention, the system further includes a solar radiation detection unit configured to detect solar radiation falling on the vehicle. In the system, the air conditioning time acquisition unit acquires the air conditioning time after taking a result of detection by the solar radiation detection unit into consideration.

According to a fourth aspect of the present invention, the system further includes a grant permission unit configured to determine whether a permission to carryout air conditioning is granted or rejected after determining that there is supply of enough power equal to or greater than power consumed by conditioning the passenger compartment and charging the battery unit from an external power source. In the system, the control unit allows conditioning air within the passenger compartment based on a result of determination by the permission grant unit.

Advantageous Effects of the Invention

In this way, according to the first aspect of the present invention, it is now possible to complete conditioning of air upon completion of charge by acquiring the time it takes to charge the battery unit until charge is completed by calculation or request, acquiring the time it takes to condition air within the passenger compartment and allowing conditioning air within the passenger compartment if the charge time left is less than or equal to the air conditioning time. Thus, if there is a need to condition air within the passenger compartment to a comfortable level before a user gets in to drive the vehicle after charge, the air conditioning time during the charge can be shortened to a minimum and the amount of power consumed by the preparatory air conditioning can be reduced to a minimum. In addition, conditioning of air during charge can be made as short as possible by avoiding conditioning of air after the passenger compartment has been conditioned to comfortable environment, and extension of the charge time can be avoided by reducing the consumption of power.

According to the second aspect of the present invention, it is now possible to initiate conditioning air within the passenger compartment at the start time reflecting realities by acquiring the time it takes to condition air within the passenger compartment by taking not only the interior air temperature within the passenger compartment, but also the outside air temperature into consideration. Thus, it is now possible to avoid the situation that the completion of air conditioning is too late or too early to waste consumption of power under great influence of the outside air temperature.

According to the third aspect of the present invention it is now possible to initiate conditioning air within the passenger compartment at the start time reflecting realities more by acquiring the time it takes to condition air within the passenger compartment by taking not only the interior air temperature within the passenger compartment and the outside air temperature, but also the solar radiation into consideration. Thus, it is now possible to avoid the situation that the completion of air conditioning is too late or too early to waste consumption of power under great influence of the solar radiation in addition to the outside air temperature.

According to the fourth aspect of the present invention, it is now possible to avoid the situation that the charge time might be prolonged by consumption of power to be used for charge by conditioning air. Thus, nothing bars early restart because conditioning air is allowed only if there is no need for quick charge.

DESCRIPTION OF EMBODIMENTS

Referring to the drawings, an embodiment of the present invention is described in detail. FIGS. 1 to 7 show an air conditioning system according to one embodiment.

Figure 1:
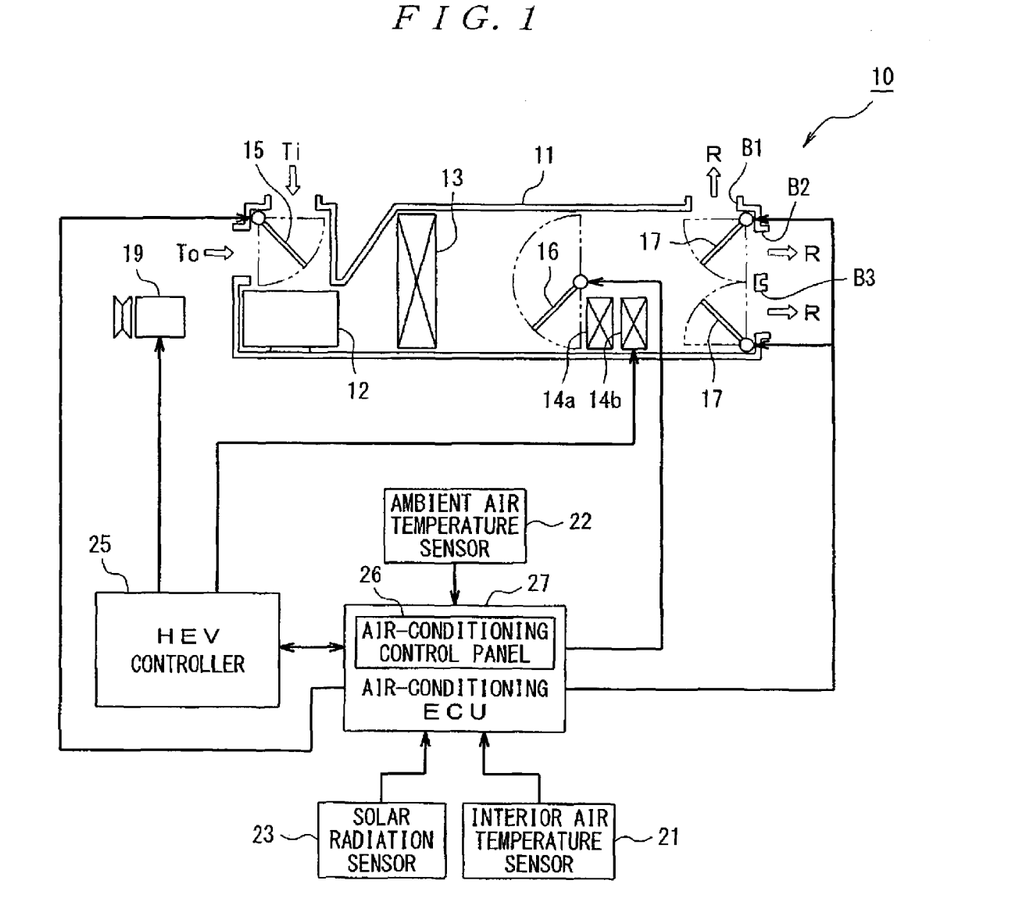
FIG. 1 is a diagrammatic illustration of a vehicular air conditioning system according to one exemplary embodiment.

With reference to FIG. 1, the air conditioning system 10 is, in particular, a heating, ventilation, and air conditioning (HVAC) system for conditioning environment of a passenger compartment R of a vehicle or electric vehicle with an internal combustion engine, so-called a hybrid electric vehicle (HEV), by performing a heating, cooling, dehumidification, or ventilation function.

The air conditioning system 10 includes a blower in the form of a blower fan (a blower) 12, an evaporator 13, a heater core 14a and an auxiliary heater 14b, an inlet damper (a recirculation door) 15, an air-mixing damper (a blend door) 16, an outlet damper (a mode damper) 17, an interior air temperature sensor (an interior air detection unit) 21, an outside air temperature sensor (an outside air detection unit) 22, a solar radiation sensor (a solar radiation detection unit) 23, a hybrid electric vehicle (HEV) controller 25 and an air-conditioning (AC) electronic control unit (ECU) 27.

The blower fan 12 draws air into a duct 11 such that air enters the duct 11 from the upstream side and flows toward the downstream side to form flow of air. The evaporator 13 absorbs heat energy from air that flows through the duct 11. The heater core 14a and auxiliary heater 14b heat air that flows through the duct 11. The inlet damper 15 selectively connects a passage, through which the blower fan 12 draws air into the duct 11, to an outside intake (an outside air passage) $T_o$ or an interior intake (an interior air passage) $T_i$. The air-mixing damper 16 controls air passing through the duct 11 in a manner as to let a portion of the air flow into a passage that extends over, in contact with, the heater core 14a and auxiliary heater 14b. The outlet damper 17 selectively connects a passage for air blown out of the duct 11 to at least one of a set of duct outlets B1, B2 and B3 provided in the passenger compartment R. The interior air temperature sensor 21 senses an air temperature in the passenger compartment R (also called an "interior air temperature" below). The outside air temperature sensor 22 senses an outside air temperature outside the passenger compartment R. The solar radiation sensor 23 senses the quantity of solar light received by the passenger compartment R of the vehicle. The HEV controller 25 controls various function components including the blower fan 12, evaporator 13, auxiliary heater 14b and the like. The AC ECU 27 monitors the sensors 21, 22 and 23 and various settings selected by manipulating an air conditioner (AC) control panel 26 and controls the opening and closing operation of the various dampers 15, 16 and 17.

In the air conditioning system 10, the HEV controller 25 and AC ECU 27 cooperate with each other to adjustably maintain comfortable environment within the passenger compartment R.

The evaporator 13 allows entry of refrigerant flow regulated by a thermal expansion valve that receives high pressure refrigerant liquid from a condenser, not shown, where refrigerant gas from a motor-driven compressor 19 condenses and serves as a heat absorption component absorbing large amounts of heat when refrigerant evaporates. This evaporator 13 is located in the duct 11 to cool air passing (contacting with) the evaporator fins.

The heater core 14a located in the duct 11 allows hot coolant from the vehicle's engine to pass through a winding tube to heat air forced to pass fins attached to the tube. The auxiliary heater 14b is a Positive Temperature Coefficient (PTC) ceramic heater. The PTC heater 14b is energized by turning on electricity to heat air that flows through the duct 11 and serves as an auxiliary heating unit when the vehicle engine stops, but it is turned off after the vehicle engine has been started because the heater core 14a becomes effective to heat air during operation of the vehicle engine.

The HEV controller 25 has an integrated control of the whole of an electric vehicle including an internal combustion engine. According to the integrated control, in order to realize that the electric vehicle runs efficiently, the HEV controller 25 coordinates the engine control with the motor control in accordance with control programs, various kinds of parameters and the like, which are prepared beforehand, based on various kinds of settings and information obtained by monitoring various sensors. In addition, the HEV controller 25 charges the regenerative battery unit, not illustrated, with electric energy regenerated by setting the electric motor to work as a generator during regenerative braking while the electric vehicle is travelling.

Figure 2:
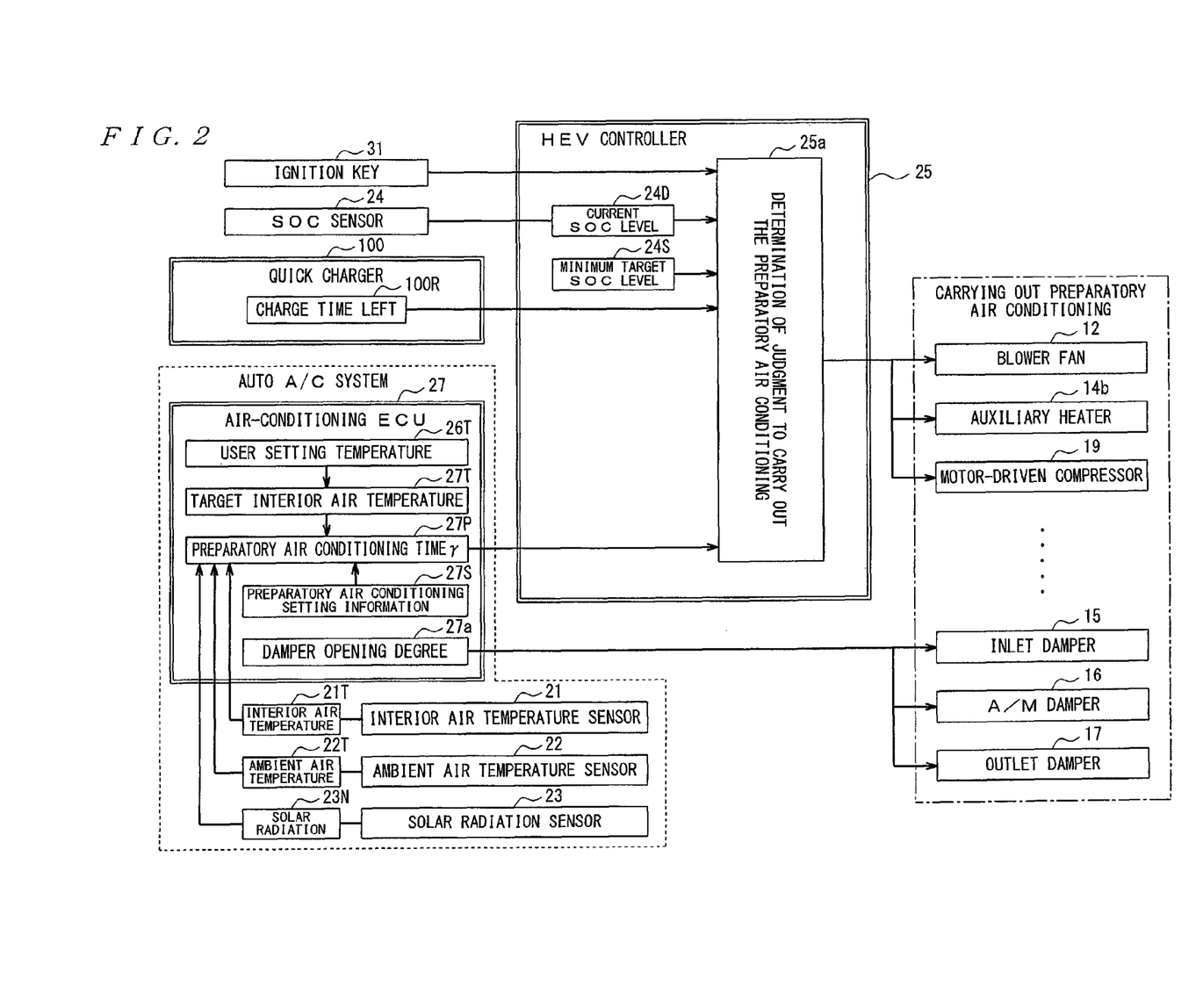
FIG. 2 is a block diagram illustrating the exchange of information during preparatory air conditioning.

This HEV controller 25 has start & stop engine control and on & off motor control which are initiated upon receiving a signal generated by operating an ignition key 31. The HEV controller 25 monitors a State of Charge (SOC) sensor (an SOC detection unit) 24 that detects a charge level or SOC level in the rechargeable battery unit. It permits driving and air conditioning when a current SOC level 24D detected by the SOC sensor 24 is in excess of a minimum target SOC level 24S.

In addition, when the current SOC level 24D detected by the SOC sensor 24 is equal to or below the minimum target SOC level 24S, the HEV controller 25 provides a charge demand to a display of an instrument or control panel, not illustrated, in order to urge the charge of the battery unit. The battery unit may be charged with electric energy from an external EV quick charger 100. The quick charger 100 receives information about the capacity of the battery unit and the current SOC level 24D from the HEV controller 25, calculates how much charge time left till completion of full charge when a predetermined target SOC level is accomplished and presents the calculated charge time left on a display that is visible. In reply to an inquiry, the quick charger 100 delivers the charge time left 100R to the HEV controller 25. Thus, the HEV controller 25 constitutes a so-called "charge time left acquisition unit." The present embodiment is explained taking the case in which a quick charger is used during charge as an example, but it goes without saying that the present embodiment is applicable to the case in which an ordinary charger charges a battery utilizing electricity from midnight power service at each home.

The AC ECU 27 includes an air conditioner (AC) control panel 26 which allows users to select settings including various kinds of air conditioner conditions. The AC ECU 27 is coupled to the interior air temperature sensor 21, outside air temperature sensor 22 and solar radiation sensor 23 and receives various kinds of sensor information including those from such sensors. In accordance with control programs prepared beforehand, the AC ECU 27 generates air conditioner control signals based on various kinds of AC control panel information represented by settings entered from the AC control panel 26 and various kinds of detected information which are acquired by the various sensors 21, 22 and 23 and delivers such control signals to the HEV controller 25 so as to have the HEV controller 25 control and drive the blower fan 12, evaporator 13 (motor-driven compressor 19), auxiliary heater 14b and the like. In accordance with control programs prepared beforehand, the AC ECU 27 too controls and drives the inlet damper 15, air-mixing damper 16 and outlet damper 17 to control air conditioning in the passenger compartment R. The AC ECU 27 controls supply of current to drive motors, not illustrated, for the inlet damper 15, air-mixing damper 16 and outlet damper 17 to form a desired air flow structure.

Moreover, the AC ECU 27 carries out a so-called "preparatory air conditioning", in which, it conducts adjustment of the air temperature within the passenger compartment R to a target interior air temperature 27T in accordance with settings entered from the AC control panel 26 during charge so that the passenger compartment R will be comfortable to get in to drive the vehicle after fast charge.

In the process of carrying out the preparatory air conditioning, the AC ECU 27 determines a so-called "preparatory air conditioning time" 27P (or a "preparatory air conditioning time γ" described later), which is the time it takes to adjust interior air temperature within the passenger compartment R to the target interior air temperature 27T, after calculation based on preparatory air conditioning setting information 27S, a user setting temperature 26T, target interior air temperature 27T and various kinds of sensor information 21T, 22T and 23N. The AC ECU 27 delivers the determined time to the HEV controller 25. It means that this AC ECU 27 is configured to form a so-called "air conditioning time acquisition unit."

The preparatory air conditioning setting information 27S is information, entered from the AC control panel 26, about on/off of the preparatory air conditioning, drive condition and the like. The user setting temperature 26T is a set temperature in the passenger compartment R represented by settings entered from the AC control panel 26. The target interior air temperature 27T is a target temperature upon completion of charge which is determined based on the user setting temperature 26T. The sensor information 21T is sensor information by the interior air temperature sensor 21. The sensor information 22T is sensor information by the outside air temperature sensor 22. The sensor information 23N is sensor information by the solar radiation sensor 23.

Then, serving as a so-called "permission grant unit (or an air conditioning control unit) 25a" to determine whether a permission to carry out the preparatory air conditioning is granted or rejected, the HEV controller 25 determines whether a permission to carry out the preparatory air conditioning is granted or rejected after comparing the charge time left 100R, which is the time it takes till completion of charge, acquired from the EV fast charger 100 to the preparatory air conditioning time 27P delivered by the AC ECU 27 and drives the blower fan 12, evaporator 13 and auxiliary heater 14b in the same manner as the normal air conditioning. Serving as a damper opening degree adjustment unit 27a, the AC ECU 27 carries out air conditioning within the passenger compartment R by driving the inlet damper 15, air-mixing damper 16 and outlet damper 17 based on various kinds of sensor information.

Figure 3:
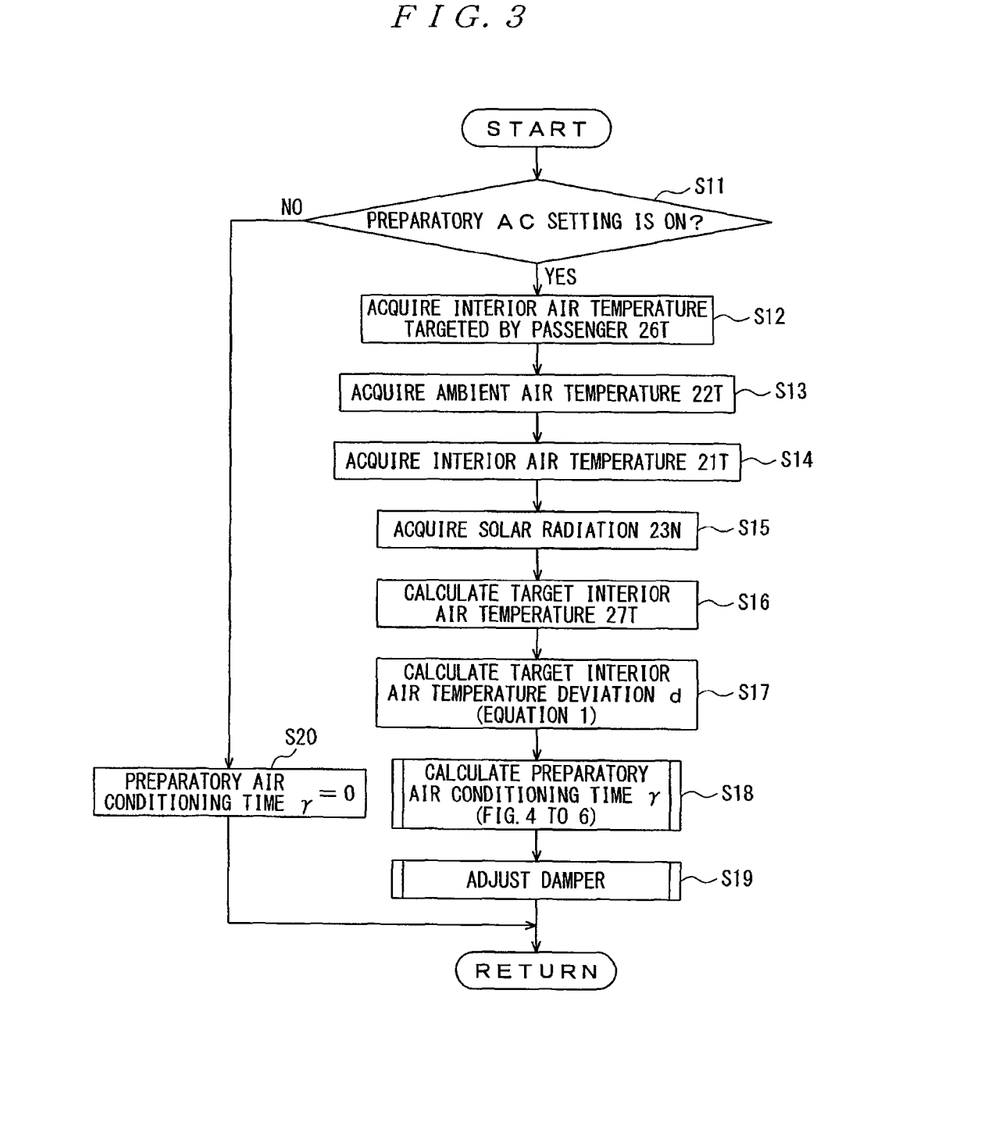
FIG. 3 is a flowchart illustrating the procedure of determining conditions for preparatory air conditioning.
Figure 4:
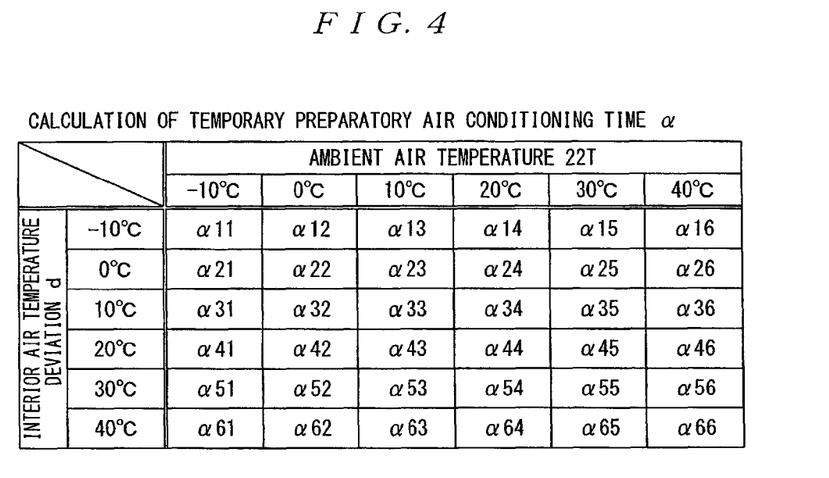
FIG. 4 is a table used to determine a temporary preparatory air conditioning time based on an interior air temperature deviation and an outside air temperature.

Specifically, the AC ECU 27 carries out steps (a method) for controlling the preparatory air conditioning shown by the flowchart in FIG. 3.

After initiating control for charging the battery unit, the AC ECU 27 determines whether the preparatory air conditioning that is set by manipulating the AC control panel 26 is ON or OFF (step S11). If it does not determine that the preparatory air condition is set ON, the AC ECU 27 sets zero "0" as the preparatory air conditioning time γ described later (step S20) and suspends the preparatory air conditioning control. It is possible to further set the preparatory air conditioning ON by manipulating the AC control panel 26 even after charge has begun and the determination step S11 is repeated.

If it determines at step S11 that the preparatory air conditioning is set ON, the AC ECU 27 acquires a set temperature 26T for the passenger compartment R (step S12), which temperature is represented by input settings by manipulating the AC control panel 26; an outside air temperature 22T outside the passenger compartment R (step S13), which is detected by the outside air temperature sensor 22; an interior air temperature 21T within the passenger compartment R (step S14), which is detected by the interior air temperature sensor 21; and solar radiation 23N falling on inside the passenger compartment R (step S15), which is detected by the solar radiation sensor 23.

Subsequently, the AC ECU 27 calculates a target interior air temperature 27T suitable for the preparatory air conditioning based on the acquired set temperature 26T for the passenger compartment R (step S16). Specifically, the AC ECU 27 calculates this target interior air temperature 27T using the set temperature 26T, interior air temperature 21T, outside air temperature 22T, solar radiation 23N and the like. It is, however, proper to set the center value of 25° C. (25 degrees Celsius) as the setting temperature 26T. By adjusting the setting temperature 26T when the user gets in the passenger compartment R to drive the vehicle, the user can have the passenger compartment R conditioned at a comfortable level with reduced consumption of power out of the battery unit.

Next, using the following equation (1), the AC ECU 27 calculates an interior air temperature deviation d (or a difference between) of the detected actual interior air temperature 21T from the calculated target interior air temperature 27T (step S17).

(Interior air temperature deviation $d$)=(Target interior air temperature 27$T$)−(Interior air temperature 21$T$)    (1)

Based on the above-mentioned interior air temperature deviation d, outside air temperature 22T and solar radiation 23N, the AC ECU 27 calculates the preparatory air conditioning time γ it takes to adjust the air temperature within the passenger compartment R to the target interior air temperature 27T (step S18).

The details on how to determine at step S18 the preparatory air conditioning time γ are now mentioned. The AC ECU 27 refers to a table (called an "air conditioning time map") shown in FIG. 4 to determine a so-called "temporary preparatory air conditioning time" α, which is the time it takes to adjust the interior air temperature 21T within the passenger compartment R to the target interior air temperature 27T under the influence of the interior air temperature deviation d and the outside air temperature 22T. The AC ECU 27 determines the temporary preparatory air conditioning time α from the air conditioning time map. This map contains air conditioning time data α11 to α66, each being accessible with and placed in a field labeled by one of sub-ranges of 10° C. of a range of the interior air temperature deviation d from −10° C. to 40° C. and one of sub-ranges of 10° C. of a range of the outside air temperature 22T from −10° C. to 40° C.

Figure 5:
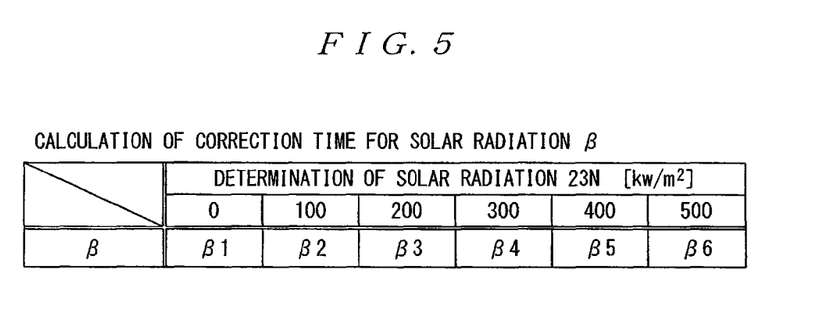
FIG. 5 is a table used to acquire a correction time that depends on solar radiation for correcting the temporary preparatory air conditioning time.

Subsequently, the AC ECU 27 refers to a table (called a "correction time map") shown in FIG. 5 to determine a correction time β, which is the additional time it takes to compensate for influence of heat by the solar radiation 23N on the air within the passenger compartment R. The AC ECU 27 determines the correction time β from the correction time map. This map contains correction time data β1 to β6 which vary with different levels of the solar radiation 23N (kW/m²).

Figure 6:
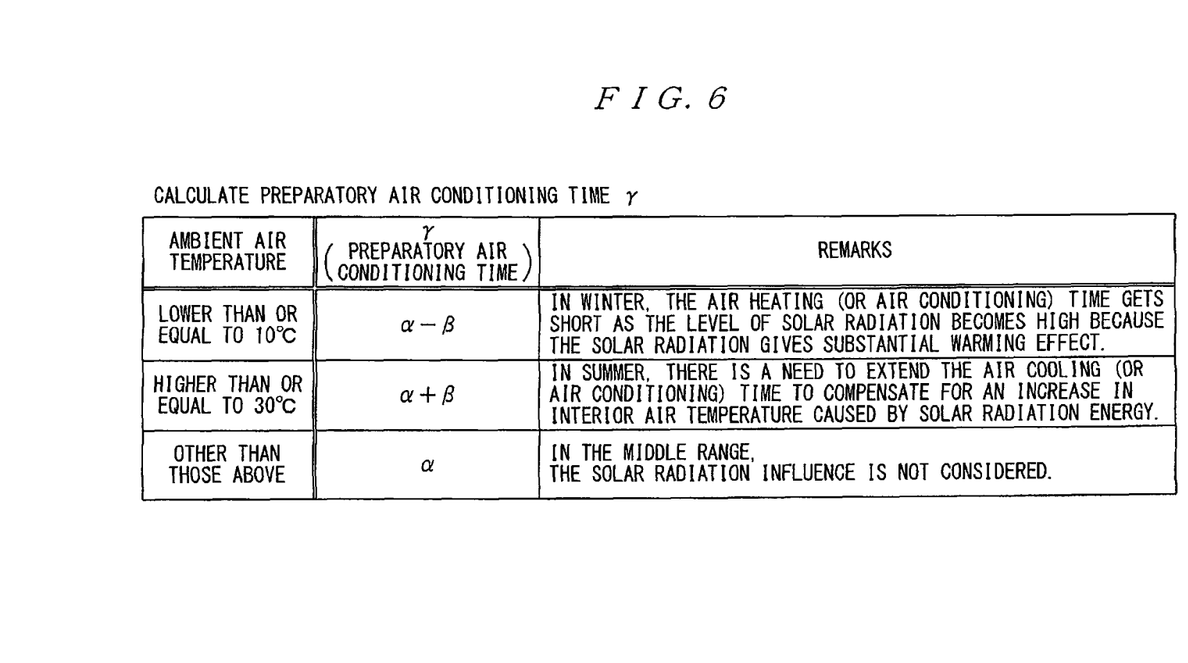
FIG. 6 is a table illustrating a calculation method for adjusting the preparatory air conditioning time in keeping with the season.

It appears appropriate to determine the preparatory air conditioning time γ that is the time it takes to adjust the interior air temperature within the passenger compartment R to the target interior air temperature 27T in consideration of the following seasonal influence of solar radiation. In winter, the air heating (or air conditioning) time gets short as the level of solar radiation becomes high because the solar radiation gives substantial warming (or heating) effect. In summer, there is a need to extend the air cooling (or air conditioning) time to compensate for an increase in interior air temperature caused by solar radiation energy because the solar radiation accelerates an increase in air temperature within the passenger compartment R.

As shown in FIG. 6, the AC ECU 27 then subtracts the correction time β from the temporary preparatory air conditioning time α to give the preparatory air conditioning time γ in a representative wintertime environment when the outside air temperature 22T is lower than or equal to 10° C.; adds the correction time β to the temporary preparatory air conditioning time α to give the preparatory air conditioning time γ in a representative summertime environment when the outside air temperature 22T is higher than or equal to 30° C.; and sets the temporary preparatory air conditioning time α as the preparatory air conditioning time γ without any serious consideration of the solar radiation influence in an environment when the outside air temperature 22T is higher than 10° C. but lower than 30° C.

This enables adjustment of the preparatory air conditioning time γ within the passenger compartment R with due consideration of not only the interior air temperature 21T within the passenger compartment R but also the outside air temperature 22T and solar radiation 23N, making it possible for the AC ECU 27 to acquire the preparatory air conditioning time γ adapted to the realities including season and weather.

From now on, the AC ECU 27 carries out adjustment of various dampers 15 to 17 depending on the input settings from the AC control panel 26 and the selection of air-flow structure 11 made based on the outside air temperature 22T and interior air temperature deviation d (step S19).

Figure 7:
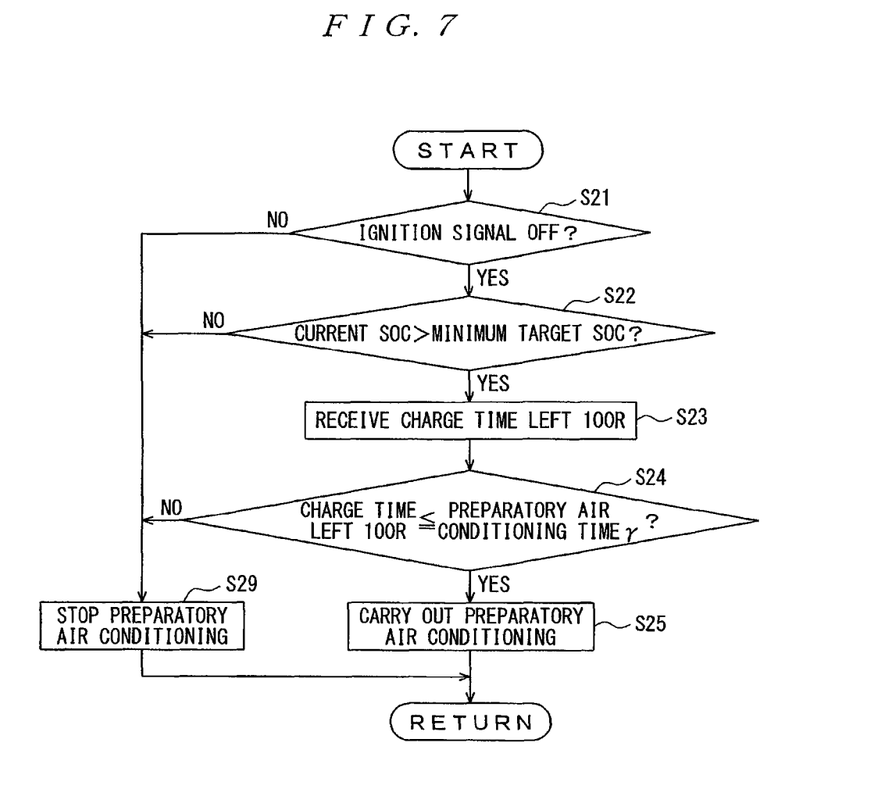
FIG. 7 is a flowchart illustrating the preparatory air conditioning.

On the other hand, the HEV controller 25 carries out steps (a method) shown by the flowchart of FIG. 7 for controlling the preparatory air conditioning.

After start of charge, the HEV controller 25 determines whether a manipulate signal called an "ignition signal" from an ignition key 31 is in ON state or OFF state (step S21). If it determines that the ignition signal is in ON state, the HEV controller 25 carries out processing to suspend the preparatory air conditioning because this is the situation where the main air conditioning should override the preparatory air conditioning (step S29). The determination job at step 21 whether the ignition signal is in ON state or OFF state is repeated after start of charge.

If, at step S21, it determines that the ignition signal is in OFF state, the HEV controller 25 determines whether or not the current SOC level 24D of the state of charge (SOC) of the battery unit, detected by the SOC sensor 24, is in excess of the minimum target SOC level 24S (step S22). If it does not determine that the current SOC level 24D is excess of the minimum target SOC level 24S, the HEV controller 25 makes control advance to step S29 where it carries out processing to suspend the preparatory air conditioning.

This causes the HEV controller 25 to avoid the deterioration of charging efficiency resulting from start of the preparatory air conditioning in spite of the current SOC level 24D being below the minimum target SOC level 24S which is the minimum charge level of the battery unit necessary for supporting the travelling, thus getting the battery unit ready for supporting the travelling even in the case there is a need to drive the vehicle in hurry.

On the other hand, if, at step S22, it determines that the current SOC level 24D is in excess of the minimum target SOC level 24S and thus the battery unit is charged more than that SOC level which permits the preparatory air conditioning, the HEV controller 25 receives the charge time left 100R from the quick charger 100 (step S23) and determines whether or not the charge time left 100R is less than or equal to the preparatory air conditioning time γ (step S24). If it does not determine that the charge time left 100R is less than or equal to the preparatory air conditioning time γ, the HEV controller 25 makes control advance to step 29 and waits.

Then, if, at step S24, it determines that the charge time left 100R is less than or equal to the preparatory air conditioning time γ, the HEV controller 25 carries out the preparatory air conditioning to adjust the air temperature within the passenger compartment R to the target interior air temperature 27T by driving the blower fan 12, evaporator 13, auxiliary heater 14b and the like in the same manner as in the normal air conditioning (step S25).

This causes the HEV controller 25 to bring the end of the preparatory air conditioning time γ, i.e., the time considering the influence of season and weather after acquiring not only the interior air temperature deviation d but also the outside air temperature 22T and solar radiation 23N, into exact timing with the completion of charging the battery unit, thus allowing the preparatory air conditioning to be completed with the minimum necessary level of air conditioning. In other words, none of the following situations will take place; one situation of conditioning air within the passenger compartment R to a comfortable level past the completion of charging the battery unit, the other situation of prolonging the charge time itself by consuming power in the battery unit to wastefully keep the passenger compartment R comfortable well before the completion of charging the battery unit.

In this way, the present embodiment can reduce the amount of power consumed by the preparatory air conditioning to a minimum by shortening the air conditioning time during charge to a minimum because the completion of the preparatory air conditioning can be brought into exact timing with the completion of charge after acquiring the charge time left 100R and the preparatory air conditioning time γ during charge. Therefore, the charge is completed quickly (without any waiting time) by carrying out the preparatory air conditioning without anytime loss, thus allowing the user to drive the vehicle after getting in the passenger compartment R.

Referring now to other embodiment, although the present embodiment has been described along an example in which the preparatory air conditioning is carried out without any consideration of the capacity of power supplied by the quick charger 100, the present embodiment is not limited to this example and may be applicable, for example, to a case in which a so-called normal charger provided at each family is used as an external power source. In this case, there is provided an optional setting of carrying out steps (a method) shown by the flowchart of FIG. 8 for controlling the preparatory air conditioning by modifying the HEV controller 25 to include one additional function.

Figure 8:
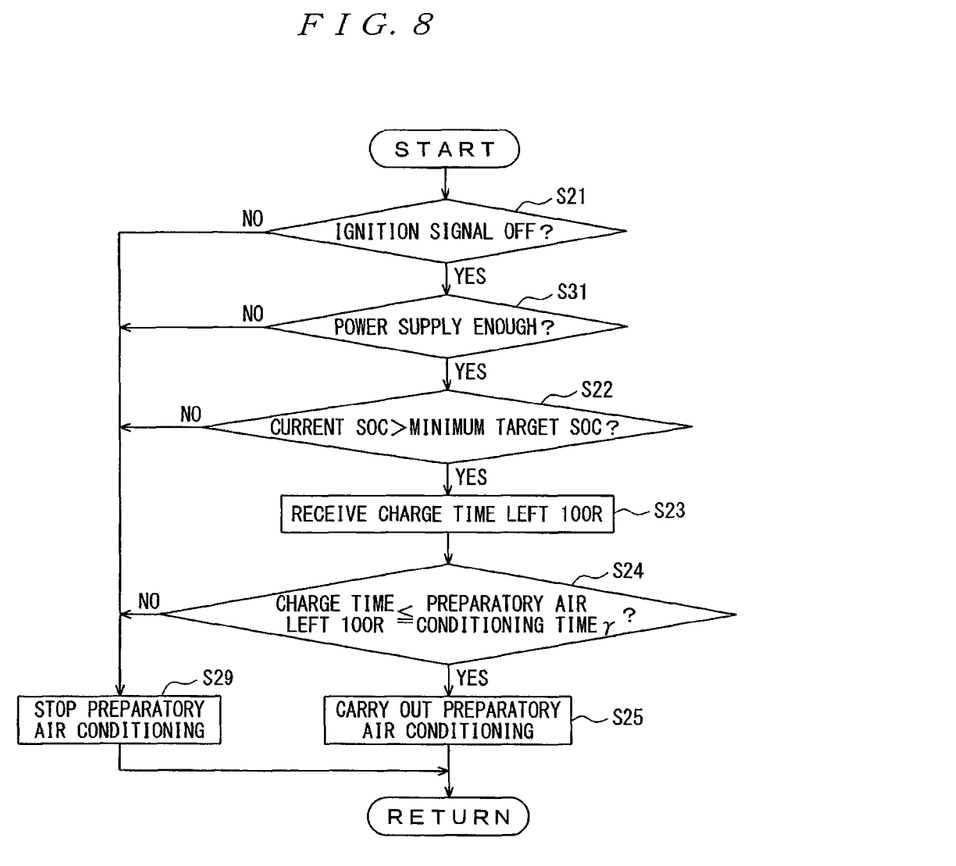
FIG. 8 is a flowchart illustrating a preparatory air conditioning according to other embodiment.

In concrete terms, the HEV controller 25 determines whether or not the ignition signal is in OFF state (step S21) to perform the function attached to a so-called "permission grant unit" 25a to determine whether a permission to carry out the preparatory air conditioning is granted or rejected (namely, an "air conditioning grant unit"). After this, the HEV controller 25 determines whether or not it is possible to receive from the normal charger enough power for carrying out the preparatory air conditioning in addition to charging the battery unit after acquiring information about the charger itself (step S31). If it determines that enough capacity of power supply is available in the charger, the HEV makes control advance to step S22 and carries out the preparatory air conditioning. If, at step S31, it determines that the capacity is too low so that the power supply from the external power source cannot fully support the preparatory air conditioning, the HEV controller 25 makes control advance to step S29 and carries out the process to halt the preparatory air conditioning. This can avoid the situation that insufficient supply of power causes charged power (i.e., power charged in the battery unit) to be partly consumed by the preparatory air conditioning to inevitably prolong the charge time.

Although, in the present embodiment, there is previously described an example in which the charge time left 100R is acquired from the quick charger 100, the charge time left 100R may be calculated at the air conditioning system 10 and acquired from it. In addition, there is previously described an example in which the HEV controller 25 controls the preparatory air conditioning, but the AC ECU 27 may control the preparatory air conditioning. In addition, there is previously described an example in which the completion of the preparatory air conditioning is brought into exact timing with the completion of charge, but the completion of the preparatory air conditioning may be brought into exact timing with the departure time. There is previously described an example in which the embodiment is applied to the engine electric hybrid vehicle (HEV), but it may be applicable to a battery or pure electric vehicle (EV).

It is not intended to limit the scope of the present invention to the exemplary embodiments. All other embodiments which provide equivalent technical effects to those by the invention are intended to come within the sprint and scope of the invention. It is not intended to limit the scope of the invention to combination(s) of various features defined in appended claims. The scope of the invention is intended to encompass any desired combination(s) of at least some of all various features disclosed in the description.

INDUSTRIAL APPLICABILITY

While embodiments and modifications have been described, it is not intended that they illustrate and describe all possible forms of the invention. Rather, it is understood that various changes may be made without departing from the spirit and scope of the invention.

REFERENCE SIGNS LIST 10 air conditioning system
11 duct
12 blower fan
13 evaporator
14a heater core
14b auxiliary heater
15 inlet damper
16 air-mixing damper
17 outlet damper
19 motor driven compressor
21 interior air temperature sensor
22 outside air temperature sensor
23 solar radiation sensor
23N solar radiation
24 SOC sensor
25 HEV controller
26 air conditioner control panel
27 air conditioner ECU
100 quick charger
R passenger compartment

The invention claimed is:

1. An air conditioning system for a passenger compartment of an electric vehicle having a rechargeable battery unit that is chargeable by supply of power from an external power source, the system comprising:
 a charge time left acquisition unit configured to acquire a charge time left that is the time it takes to charge the battery unit until charge is completed;
 an air conditioning time acquisition unit configured to acquire an air conditioning time that is the time it takes to condition air temperature within the passenger compartment to a target air temperature; and
 a control unit configured to compare the charge time left acquired by the charge time left acquisition unit with the air conditioning time acquired by the air conditioning time acquisition unit, and when a state of charge in the battery unit is equal to or greater than a preset charge level during charging of the battery unit, and when the charge time left is less than or equal to the air conditioning time, allow a start of air conditioning within the passenger compartment.

2. The system according to claim 1, further comprising:
an interior air temperature detection unit configured to detect an interior air temperature within the passenger compartment; and
an outside air temperature detection unit configured to detect an outside air temperature outside the passenger compartment,
wherein the air conditioning time acquisition unit acquires the air conditioning time based on a result of detection by the interior air temperature detection unit and a result of detection by the outside air temperature detection unit.

3. The system according to claim 2, further comprising:
a solar radiation detection unit configured to detect solar radiation falling on the vehicle,
wherein the air conditioning time acquisition unit acquires the air conditioning time after taking a result of detection by the solar radiation detection unit into consideration.

4. The system according to claim 1, further comprising:
a grant permission unit configured to determine whether a permission to carry out air conditioning is granted or rejected after determining that of it is possible to receive enough power equal to or greater than power consumed by conditioning the passenger compartment and charging the battery unit from an external power source,
wherein the grant permission unit determines that it is possible to carry out air conditioning in a case where it is possible to receive enough power equal to or greater than power consumed by conditioning the passenger compartment and charging the battery unit from the external power source, and
wherein the control unit allows starting of air conditioning within the passenger compartment in a case where the grant permission unit determines that it is possible to carry out air conditioning.

* * * * *